Sept. 30, 1969

G. W. CONIBEER 3,469,862

EXPANSION JOINTS WITH FROZEN SEALS

Filed March 8, 1966

APPLICANT
George William Conibeer
BY
    Misegades & Douglas
        ATTORNEYS

Sept. 30, 1969 G. W. CONIBEER 3,469,862
EXPANSION JOINTS WITH FROZEN SEALS
Filed March 8, 1966 4 Sheets-Sheet 3

Sept. 30, 1969   G. W. CONIBEER   3,469,862
EXPANSION JOINTS WITH FROZEN SEALS
Filed March 8, 1966                                  4 Sheets-Sheet 4

United States Patent Office 3,469,862
Patented Sept. 30, 1969

3,469,862
EXPANSION JOINTS WITH FROZEN SEALS
George William Conibeer, Whetstone, England, assignor to The English Electric Company Limited, London, England, a British company
Filed Mar. 8, 1966, Ser. No. 532,761
Claims priority, application Great Britain, Mar. 9, 1965, 9,963/65
Int. Cl. F16l 27/10, 27/12
U.S. Cl. 285—41                   1 Claim

ABSTRACT OF THE DISCLOSURE

Various forms of spigot-type expansion joints for pipelines, incorporating freeze seals, are described. The inner of the two spigot (joint) members is thermally insulated so as to be less conductive than the outer joint member. The outer end of the annular space, in which the frozen sealing material is situated, is protected by an inert atmosphere.

Summary of the invention

Figure 5:
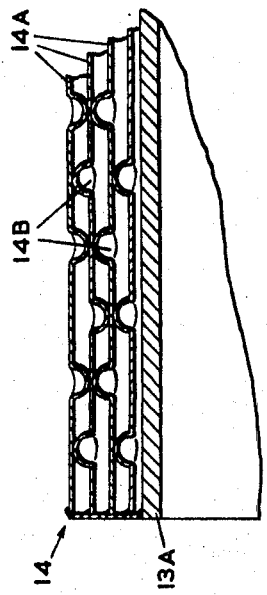

This invention relates to expansion joints for pipelines.

According to the invention, an expansion joint for a pipeline utilizes the principle of what is sometimes called a "freeze seal." In such a seal, as applied according to this invention to a pipeline, a pair of hollow joint members are connected in the pipeline one being telescopically received inside the other and relative axial movement being possible between them, there being a peripheral space between the said joint members communicating with the interior of the pipeline so that fluid flowing into said peripheral space becomes frozen by the action of cooling the outer surface of the outer of said joint members. The frozen fluid in the peripheral space forms a seal in the joint; when said relative axial movement occurs between the two joint members, the frozen seal will shear, to reform when the movement stops. Further, the outer surface of the inner joint member is thermally insulated so that the heat transfer rate through it to the interior of the pipeline is relatively low. The joint also includes inert gas in an enclosure around the exposed end of the seal, this enclosure being partly defined by said outer joint member and having inlet and outlet means so that the inert gas is used to cool the outer member whereby to freeze the fluid in the said peripheral space.

Various types of freeze seals are known. For example, U.S. Patent 3,331,608, to J. C. Charrault and others, describes a gland for a shaft, in which the packing comprises a fluid which freezes at ambient temperature. U.S. Patent 2,799,522, to E. C. King and V. K. Heckel, describes another shaft seal or gland comprising means for freezing molten metal or other liquid around a rotating shaft. U.S. Patent 3,129,947, to F. O. Streck, describes yet another shaft seal of the same basic type but comprising a solid and a liquid region, the latter being adjacent the source of the liquid metal; an inert gas is used to cover the exposed side of the frozen metal to prevent oxidation. U.S. Patent 2,992,017 describes a pipe coupling, claimed to be readily engageable and disengageable, in which two pipe ends are spigoted one within the other, liquid metal leaking into the peripheral space between them being frozen by action of an external refrigerating system.

One object of the present invention is to provide an expansion joint for a pipeline in which use is made of the freeze sealing principle.

Another object is to provide an expansion joint for pipelines carrying liquid metals (for example sodium or potassium) which is self-sealing and, in consequence, substantially leakproof. Conventional expansion joints which rely on, for example, bellows to retain the fluid within the joint, are susceptible to leakage if there should be even a minor flaw in the joint.

These and other objects of the invention will be apparent from the following description of four different expansion joints according to the invention, given by way of example and with reference to the accompanying drawings:

FIGS. 1, 2, 3 and 4 are sectional views each of a different one of said four expansion joints, and FIG. 5 is an enlarged view of a detail shown in the other figures.

Each of the four expansion joints to be described comprises a joint between two longitudinal pipes 10, 11 arranged end to end in a pipeline and each having a bore many times greater than its wall thickness.

Figure 1:
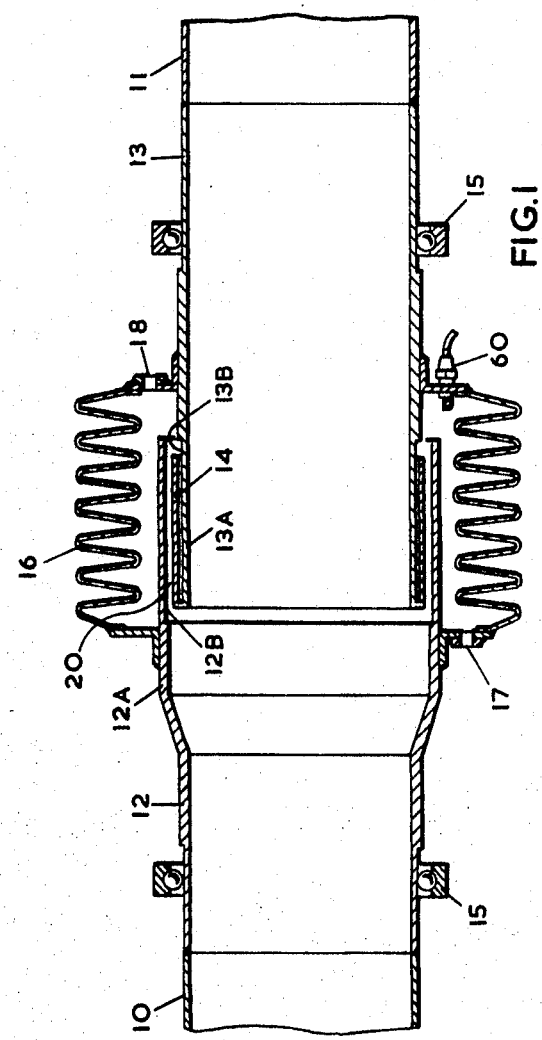

With reference now to FIGS. 1 and 5, the first joint includes a femal end fitting 12 welded co-axially onto the end of the pipe 10 and having a sleeve portion 12A, the wall thickness of which is generally greater than that of pipe 10. The bore of sleeve portion 12A is greater than the bore of pipe 10, and an annulus 12B is rough-machined in the bore of sleeve portion 12A.

The expansion joint also includes a male end fitting 13, welded co-axially on the end pipe 11 and carrying an axially-extending spigot portion 13A, the wall thickness of which is generally greater than that of pipe 11. The bore of spigot portion 13A is, however, the same as that of pipe 11.

The spigot portion 13A has an annulus 13B on its outer cylindrical surface, whereon is secured an insulating sleeve 14. The sleeve 14 preferably comprises several thicknesses of relatively thin dimpled stainless-steel sheet 14A (FIG. 5), fixed only at the outer end (i.e., the left-hand end as seen in FIGS. 1 and 5) to the spigot portion 13A, preferably by welding.

The end fittings 12, 13 are supported by ball bearings 15 in which they are free to move axially.

Secured and sealed at its two ends to the end fittings 12, 13 respectively is an expansion bellows unit 16, co-axial with and surrounding the sleeve portion 12A and spigot portion 13A.

The pipes 10, 11 may form part of a pipeline for liquid metal, for example sodium, which is preferably arranged to pass from left to right as seen in the drawings. Such metal may be at an elevated temperature: in one example, liquid sodium to be used as a secondary coolant for a nuclear reactor may pass through the pipes at about 650° C., the pressure being about 100 p.s.i.g. In such a case, relative expansion of the pipes 10, 11 can be accommodated by relative axial movement between the end fittings 12, 13, the bellows unit 16 contracting accordingly.

The bellows unit 16 is provided with an inert gas inlet and outlet, indicated respectively at 17 and 18 in FIG. 1 and connected in an inert gas supply system whereby an inert gas such as argon is pumped under pressure through the inlet 17, bellows unit 16 and outlet 18 to a heat exchanger (not shown), wherein the gas is cooled by heat exchange with a fluid such as water, the gas then being pumped back to the inlet 17. Some liquid metal passes, in operation, from the interior of sleeve portion 12A into the annular space 20 between the insulating sleeve 14 and sleeve portion 12A, and is cooled by the inert gas in the bellows unit 16.

It will be noted that the bore of sleeve portion 12A is such as to allow the annular space 20 to be of suitable width.

The flow of inert gas is maintained at a rate sufficient to cause said liquid metal in the annular space 20 to freeze before it can enter the bellows unit 16, thus sealing the liquid metal flowing in the pipeline from the interior of the bellows unit 16. The sleeve portion 12A and spigot portion 13A are made long enough axially for freezing of the liquid metal to occur in space 20.

At the start of any relative axial movement between the sleeve portion 12A and spigot portion 13A frozen metal in the annular space 20 will shear, thus allowing this relative axial movement to continue: any consequent seepage of liquid metal through cracks in the sheared metal being quickly frozen by the inert gas.

The purpose of the insulating sleeve 14, which is seen best in FIG. 5, is to enable freezing of liquid metal to take place easily in space 20, by allowing a temperature gradient to occur between the annular space 20 and spigot portion 13A. The dimpled form of the sheets 14A is adopted so as to enable inert gas to penetrate between the sheets 14A and so improve the thermal insulation. It will be understood, however, that this is only one possible form of insulating sleeve; any suitable form may be used provided it is chemically compatible with the fluid to be passed along the pipes 10, 11 and with the coolant gas in the bellows unit 16, and provided also it is suitable for use at the required temperatures and pressures.

Figure 2:
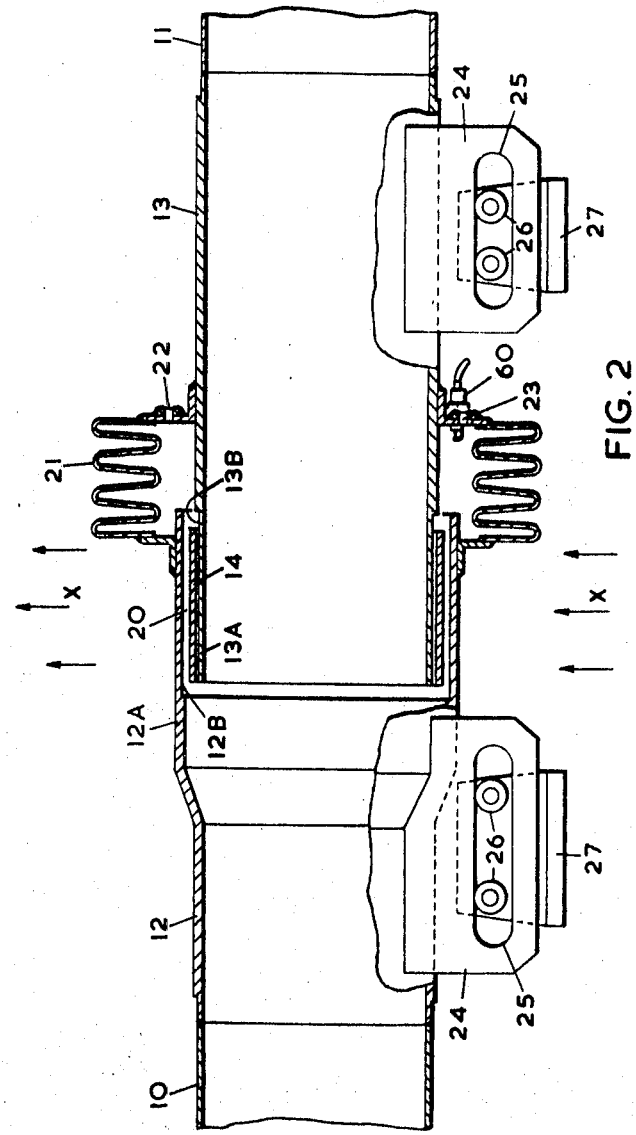

With reference now to FIG. 2, in another expansion joint according to the invention, especially suitable for use where there are no facilities for cooling the inert gas, the bellows unit 21 is relatively short and is arranged so that at least the greater part of the sleeve portion 12A is not surrounded by the bellows unit. In this case a permanent supply of inert gas is trapped within the bellows unit 21, an inlet 22 being provided for replenishing any gas lost through leakage. An air purging point 23 may also be provided in the bellows unit 21. Cooling of the expansion joint, to enable liquid metal to freeze in the annular space 20, is achieved by passing a forced cold air supply around the outside of sleeve portion 12A (which may be provided with cooling fins, not shown), as indicated by the arrows X.

Figure 3:
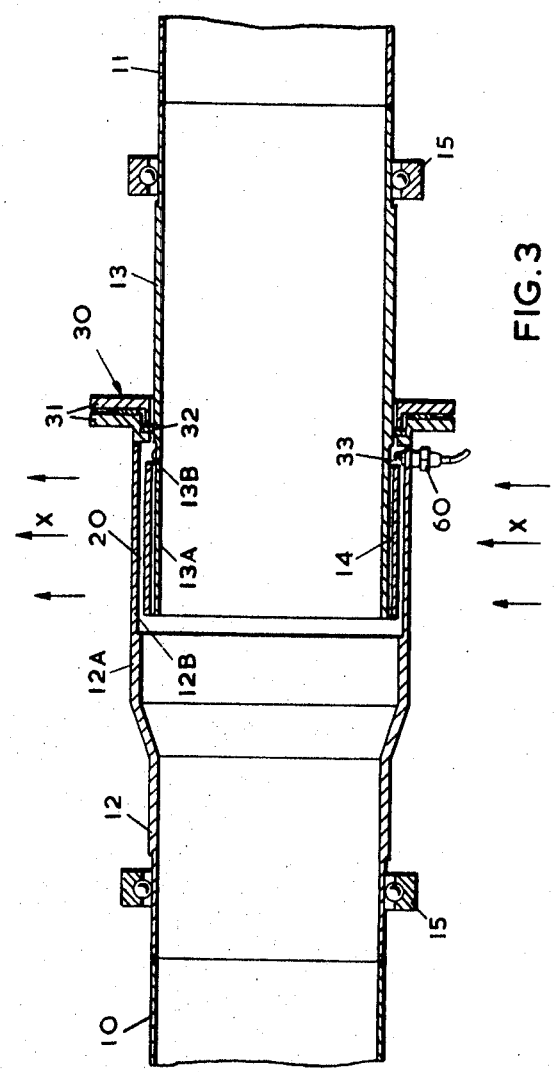

With reference now to FIG. 3, another form of expansion joint according to the invention is similar to that shown in FIG. 2, except that instead of the bellows unit 21 a composite flange or stuffing box 30 is provided. The stuffing box 30 comprises a pair of radial flanges 31, fixed to the end of sleeve portion 12A and having a packing gland 32 to provide a sliding seal over the outside of the end fitting 13. The small space 33 between the insulating sleeve 14 and stuffing box 30 is filled with argon or another suitable inert gas. The packing used for the gland 32 is such as to have no chemical reaction with the liquid metal.

Figure 4:
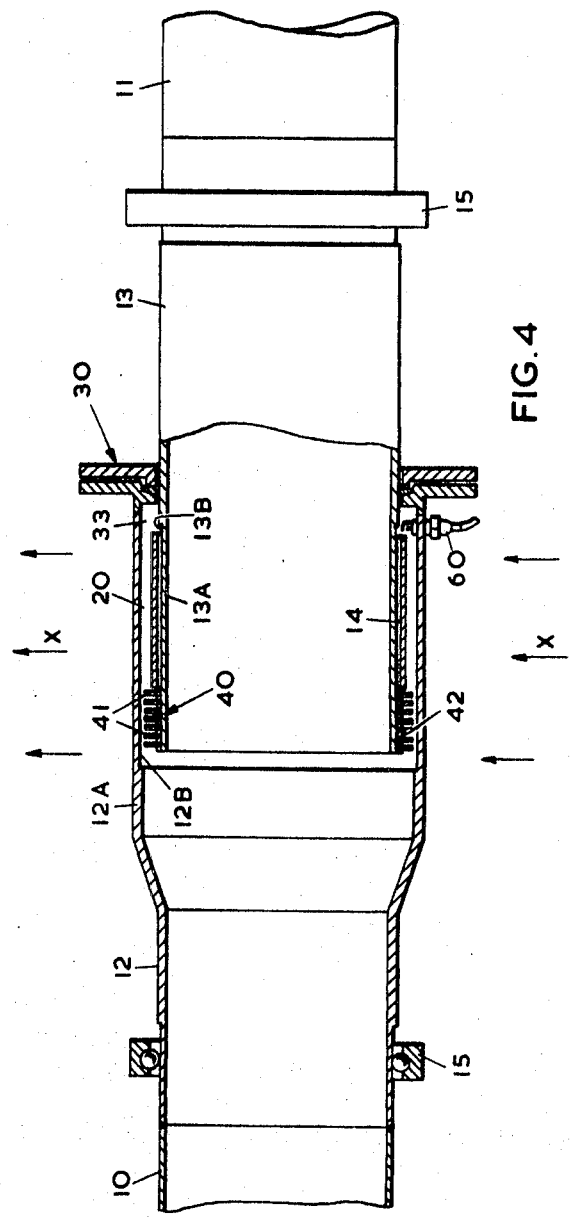

With reference now to FIG. 4, a further form of expansion joint according to the invention is similar to that in FIG. 3 but incorporates a finned collar 40 surrounding the end of the spigot member 13A adjacent the insulating sleeve 14. The finned collar 40 is built up from alternate thin rings 41 and thicker spacer rings 42, and cooperates with the bore of sleeve portion 12A to form a labyrinth seal. The thin strips 41 have a diameter such that at working temperatures there is a mild interference fit between them and the bore of sleeve portion 12A, so as to restrict entry of liquid metal to the annular space 20. In operation, therefore, some liquid metal is trapped in the annular space 20.

In a typical method of commissioning a pipeline including an expansion joint according to any one of FIGS. 1 to 4 for carrying liquid metal, the pipes 10, 11 are first filled with hot circulated argon or other suitable inert gas. This is done so as to raise the pipe wall temperature so that oxides of liquid metal will not be deposited. It also serves to reduce the risk of ignition if the liquid metal is inflammable or explosive. Hot liquid metal, at a temperature substantially greater than the plugging value (for example, at about 350° C. for liquid sodium), is introduced to the pipeline, displacing the inert gas.

It will be noted that some inert gas will, however be trapped within the bellows unit 16 or 21 (FIGS. 1 and 2) or, in the case of the joints shown in FIGS. 3 and 4, in the space 33. When the liquid metal reaches the expansion joint, the metal is prevented from flowing out of the annular space 20 by cooling the external face of the sleeve, using for example one or other of the methods described above, so that metal freezes in the annular space 20.

In the expansion joints described herein, the sleeve portion 12A expands radially by an amount less than does the spigot portion 13A, so that during commissioning of the pipeline the radial width of the annular space 20 decreases.

The plastic flow properties of the liquid metal when frozen will usually (for example in the case of sodium or potassium) prevent any undue compression of the insulating sleeve 14.

In FIGS. 1 to 4 a sparking plug 60 is shown within the space which in normal operation contains inert gas, adjacent the outer end of the annular space 20 (i.e., within bellows unit 16 or 20, or within the space 33). This plug 60 is connected electrically to suitable alarm apparatus (not shown), so that in the event of liquid metal leaking out of the annular space 20 the plug will be bridged, so completing the circuit through the alarm apparatus whereby to give warning of the leak.

Expansion joints according to the invention may be supported by any suitable means, the ball bearings 15 shown in FIGS. 1, 3 and 4 being only one example: for instance, roller bearings may be used. A further example is shown in FIG. 2, in which each end piece 12, 13 has a bracket 24 having a longitudinal slot 25 which is supported through a pair of rollers 26 on a fixed pedestal 27. Any of these, or any other, suitable means of support may be employed with any form of expansion joint according to the invention.

In the case of rolling bearings such as the ball bearings 15, the bearings are arranged so that when the pipeline is cold there is a relatively large clearance between the elements of each bearing and the outer surface of the corresponding end piece 12, 13, and so that under high-temperature conditions this clearance is minimal, thus ensuring good alignment between the sleeve and spigot portions 12A, 13A with no possibility of fouling between them. The rolling bearings are installed before the end pieces 12, 13 are attached to the pipes 10, 11.

It will be understood that in the embodiments shown in FIGS. 1 and 2, the bellows units 16 and 21 act as secondary seals, the normally-frozen metal in the annular space 20 constituting a primary seal. This is especially of value in the case of a liquid metal (such as sodium or potassium) which tends to ignite at high temperatures in contact with air: the inert gas within the bellows unit prevents the metal coming into contact with air. The same is true of the inert gas in the space 33 in FIGS. 3 and 4.

Expansion joints such as those described herein are especially suitable for use in pipelines forming part of a liquid-metal coolant circuit for a nuclear reactor. In one such application such a pipeline is included in a secondary coolant circuit which includes, within a reactor tank, heat exchangers in which the liquid metal receives heat from a primary coolant fluid heated by nuclear fuel within the reactor tank, and further heat exchangers wherein the liquid metal in the secondary coolant circuit gives up heat to water so as to form steam for driving a steam turbine.

Applications of the invention are not however confined to nuclear reactors: it may be used in any application where piping is required for carrying a fluid which is capable of being frozen in the expansion joint to form a seal. One example of such a fluid is water.

Normally, especially in the case of a long straight run of pipework, an expansion joint according to the invention will be located in the middle of the run, the ends of which will be firmly anchored so that all thermal expansion of the pipework is taken up by the expansion joint.

I claim:

1. An expansion joint for a pipeline, comprising a pair of hollow joint members connected in the pipeline, one said hollow joint member being telescopically received inside the other said hollow joint member, arranged to allow relative axial movement therebetween and being of such relative size that between them a peripheral space is provided which communicates with the interior of the pipeline allowing some of the fluid flowing in the pipeline to flow into said peripheral space and some of the pipeline fluid being in said peripheral space defined by said inner and outer members, and cooling means cooling the external surface of the outer of said joint members by flow of a fluid over said external surface causing said fluid in said peripheral space to freeze by heat transfer through said outer joint member, thereby forming a seal in the joint between the inner and outer members whereby upon relative motion of said inner member with respect to said outer member said frozen seal will shear and upon stopping of said relative action another frozen seal will form; the surface of the inner of said joint members in said peripheral space being provided with thermal insulation so that the rate of heat transfer between said peripheral space and the interior of the pipeline is substantially less than that through said outer joint member; means including said outer joint member, defining an enclosure around an outer end of said telescoping joint and said peripheral space and means introducing an inert gas to said enclosure; said inert atmosphere being in direct contact with said seal; and wherein outlet means are provided on said enclosure for removing said inert gas, said enclosure and said inlet and outlet means together constituting said cooling means so that flow of inert gas through the enclosure cooling the outer joint member and fluid in said peripheral space whereby to freeze the fluid in said peripheral space.

References Cited

UNITED STATES PATENTS

| | | | |
|---|---|---|---|
| 2,799,522 | 7/1957 | King et al. | 285—41 X |
| 2,992,017 | 7/1961 | Dritz | 285—41 X |
| 3,025,087 | 3/1962 | Snow | 277—26 |
| 3,129,947 | 4/1964 | Streck | 277—22 |
| 3,169,576 | 2/1965 | Lee et al. | 285—47 X |
| 3,331,608 | 7/1967 | Charrault et al. | 277—22 X |

FOREIGN PATENTS

| | | |
|---|---|---|
| 689,555 | 5/1930 | France. |
| 1,299,572 | 6/1962 | France. |
| 468,847 | 11/1928 | Germany. |
| 835,092 | 3/1952 | Germany. |
| 675,935 | 7/1952 | Great Britain. |

CARL W. TOMLIN, Primary Examiner

D. A. AROLA, Assistant Examiner

U.S. Cl. X.R.

277—26; 285—47, 61, 93, 300, 301, 351